United States Patent [19]

Wheeler

[11] Patent Number: 4,894,671
[45] Date of Patent: Jan. 16, 1990

[54] FILM PACK SUPPORT OF IMAGE-BEARING TEMPLATE

[76] Inventor: Alton D. Wheeler, 3940 Fox Meadow La., Pasadena, Tex. 77504

[21] Appl. No.: 267,830

[22] Filed: Nov. 7, 1988

[51] Int. Cl.$^4$ .................................................. G03B 17/24
[52] U.S. Cl. .................................. 354/108; 354/277; 354/296
[58] Field of Search ........................ 354/108, 277, 296

[56] References Cited

U.S. PATENT DOCUMENTS 4,268,144  5/1981  Wheeler ............................... 354/108
4,717,930  1/1988  Wheeler ............................... 354/108

Primary Examiner—Michael L. Gellner
Attorney, Agent, or Firm—William W. Haefliger

[57] ABSTRACT

A device for use in a camera in conjunction with exposure of a photographic film carried by carrier structure including a frame bounding a light passing zone, includes (a) a template in the form of a locally transparent, generally planar and rectangular sheet adapted to carry an image to be reproduced on the film,
(b) there being multiple elongated ribs integral with the sheet, and projecting outwardly from the plane of the sheet,
(c) the multiple ribs substantially bounding all of the light passing zone to block light access to that zone in directions parallel to the plane of the sheet,
(d) the ribs including a first laterally elongated rib at one end of the template to engage the frame adjacent one end of the template to prevent removal of the template in response to endwise removal of exposed film from the carrier structure, whereby the template sheet remains in the path of light transmission in directions generally normal to the plane of the sheet and to unexposed film carried by the carrier structure.

12 Claims, 4 Drawing Sheets

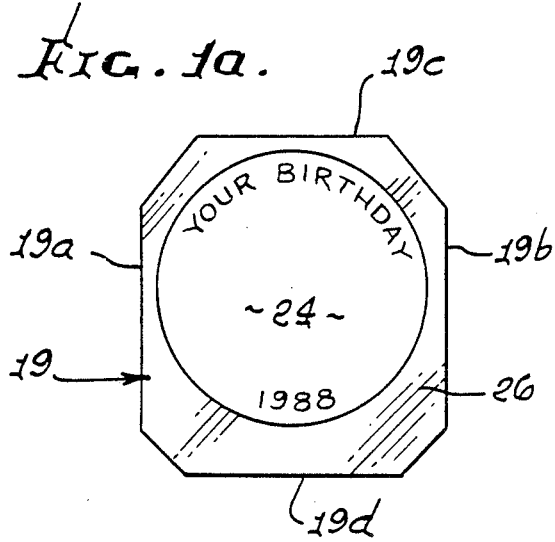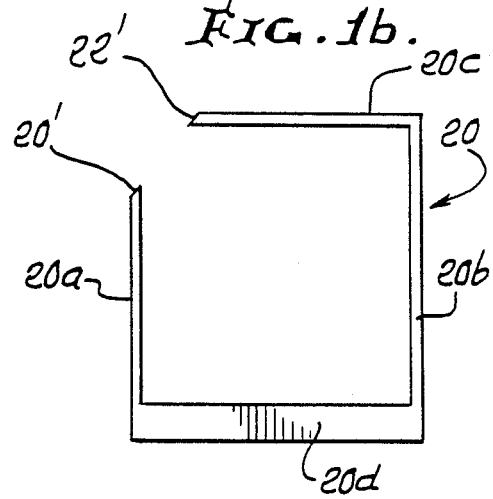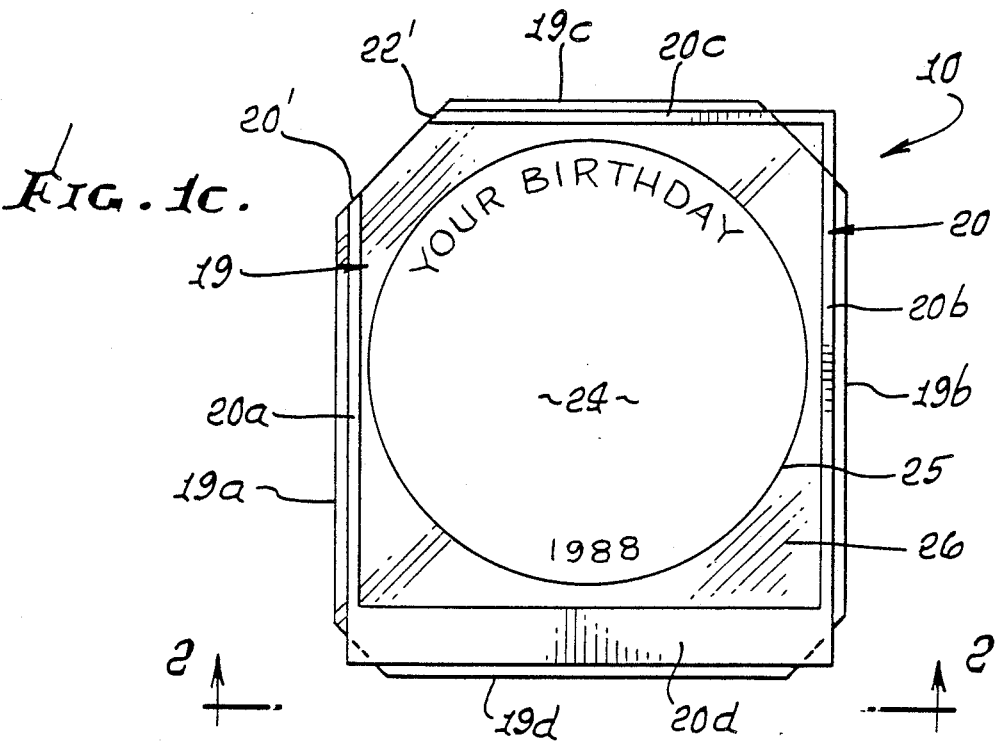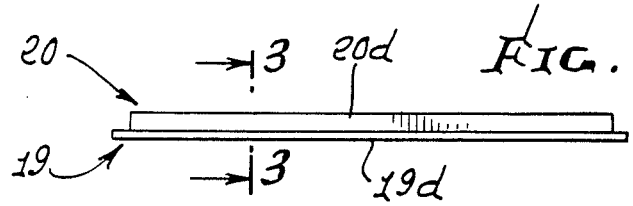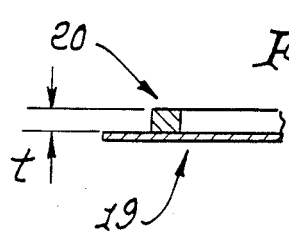

FILM PACK SUPPORT OF IMAGE-BEARING TEMPLATE

BACKGROUND OF THE INVENTION

This invention relates generally to photography, and more particularly concerns the reproducing of selected images within a camera on film being exposed to light coming from sources outside a camera. The invention relates to and improves upon the disclosure of U.S. Pat. Nos. 4,268,144, and 4,717,930.

There is a perceived need for means to permit a photograph to "label" films with selected images in addition to those resulting from entrance of external light into a camera. Thus, for example, it is of great commercial advantage to form an image or service mark of a business onto films exposed to light coming from an object or building associated with that business, all at the time of the exposure of the film. Many other examples of such need for film-labeling exist. There is also a need to provide a light modulated background for such. U.S. Pat. No. 4,717,930 discloses a device usable with a film pack; and the present invention concerns a film pack construction and associated template frame allowing film labeling.

SUMMARY OF THE INVENTION

It is a major object of the invention to provide a device of the character referred to, and which is usable in conjunction with a flash camera and with exposure of a film carried by the camera when the light flash is operated. Basically, the device comprises:

(a) a template in the form of a substantially transparent, generally planar and rectangular sheet adapted to carry an image to be reproduced on the film, (b) there being multiple elongated ribs integral with said sheet and projecting outwardly from the plane of the sheet, (c) said multiple ribs substantially bounding all of said light passing zone to block light access to said zone in directions parallel to the plane of the sheet, (d) said ribs including a first laterally elongated rib at one end of the template to engage the frame adjacent said one end of the template to prevent removal of the template in response to endwise removal of exposed film from the carrier structure, whereby the template sheet remains in the path of light transmission in directions generally normal to the plane of the sheet and to unexposed film carried by the carrier structure.

As will be seen, the ribs typically include a second laterally elongated rib at the opposite end of the template and extending parallel to said one rib, and third and fourth longitudinally elongated ribs respectively at opposite side edges of the sheet, all of the ribs projecting substantially equally outwardly relative to the plane of the sheet.

It is a further object of the invention to provide a third rib that terminates at a location spaced from one end of the second rib to provide a gap therebetween for accommodating movement of a film-retracting finger carried by the camera.

It is yet another object of the invention to provide the template with a transparent zone, and opaque zones between the transparent zone and ribs.

As will be seen, the ribs typically consist of plastic material, and are sufficiently thin to allow flexing of the sheet producing bowing of the ribs.

These and other objects and advantages of the invention, as well as the details of an illustrative embodiment, will be more fully understood from the following specification and drawings, in which:

DRAWING DESCRIPTION

FIG. 1a is a plan view of a template embodying the invention;

FIG. 1b is a plan view of a sub-frame; and

FIG. 1c is a plan view of a template and sub-frame;

FIG. 2 is an elevation taken on lines 2—2 of FIG. 1c;

FIG. 3 is an enlarged fragmentary section taken on lines 3—3 of FIG. 2;

DETAILED DESCRIPTION

Figure 9:
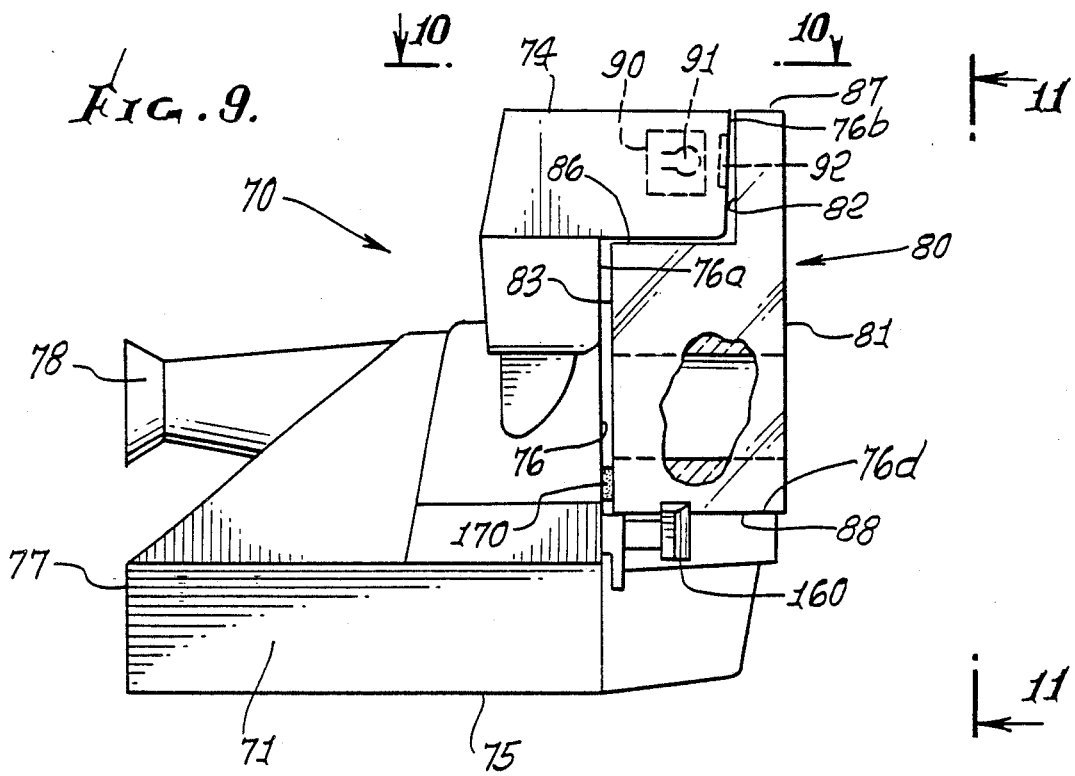
FIG. 9 is a side elevation or view of a camera incorporating the invention.
Figure 10:
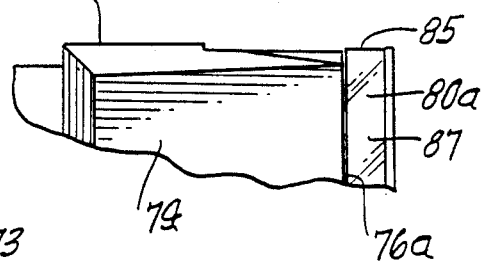
FIG. 10 is a fragmentary top plan view of a portion of the FIG. 9 camera, and taken on lines 10—10 of FIG. 9.
Figure 11:
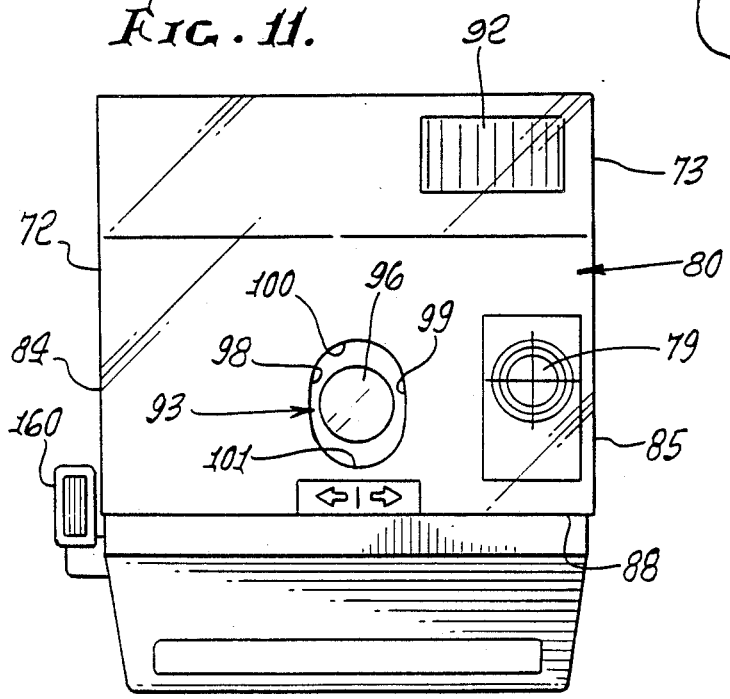
FIG. 11 is a frontal elevation on lines 11—11 of FIG. 9.

Referring first to FIGS. 9–11, a camera 70 includes a housing 71 having opposite sides 72 and 73, top 74, bottom 75, front wall 76, and rear wall 77. An eyepiece housing for viewing a target is shown at 78, the corresponding window in the front wall of the housing indicated at 79. The latter is seen in FIG. 11 through a transparent body or block overlying the window at the front thereof. That body also may extend across the length and width of the front of the camera housing, above level 88. Body 80 has a front wall 81, rear walls 82 and 83, opposite side walls 84 and 85, top walls 86 and 87, and bottom wall 88. Accordingly, it closely fits the space defined by housing front wall sections 76a (facing body upright wall 83), 76b (facing upright body wall 82), 76c, (facing body horizontal wall 86), and 76d (facing body horizontal wall 88). The body 80 may consist of clear transparent plastic material, such as Lucite, and be positioned by camera housing walls or structure, at the front of the camera, for purposes to be described or may be held in place by separate housing attachment, or by "clip-on" attachment. A Polaroid camera is one example. Another example is a Fuji camera.

Figure 12:
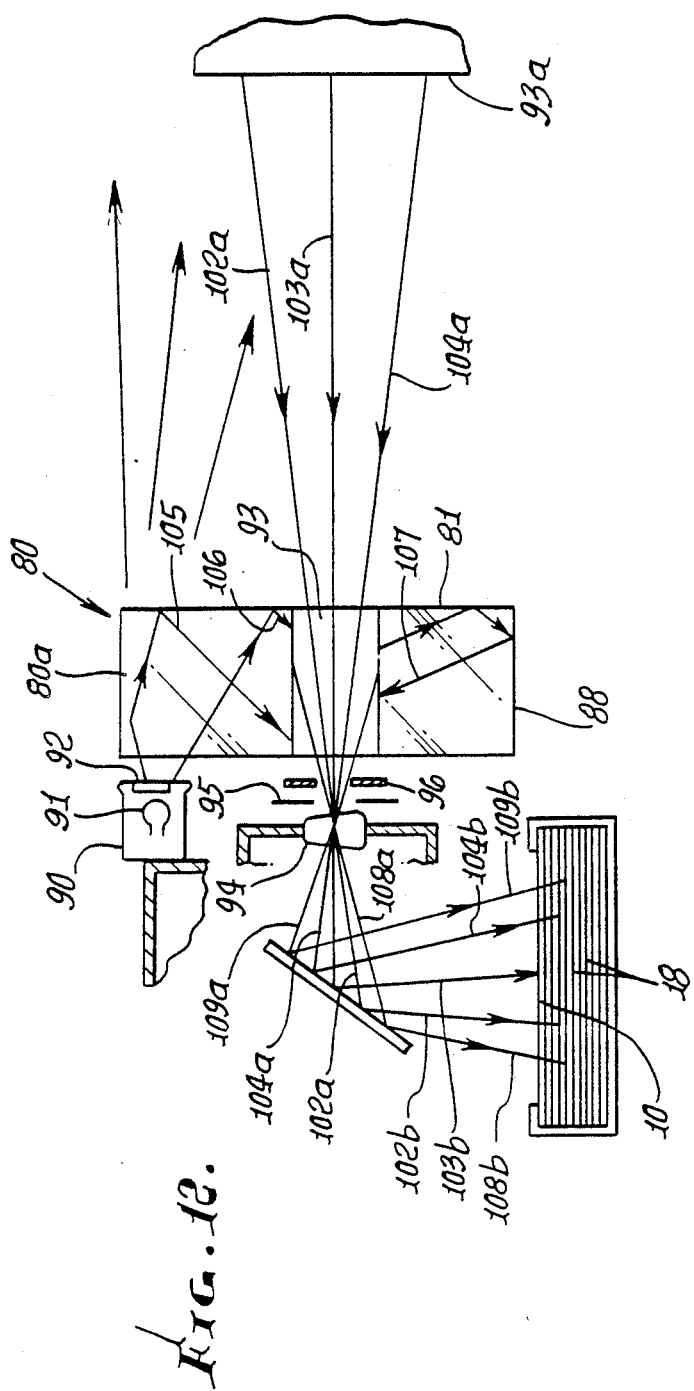
FIG. 12 is a schematic view of optical components.

The camera also includes a means for producing a light flash to illuminate the object 93 whose photograph is being taken. Such a means is indicated at 90 in FIG. 9, and may include a flash bulb 91, also seen in FIG. 12. A transparent window 92 in the camera front wall 76b passes the generated light forwardly. See also trigger 160.

In accordance with the invention, means such as block 80 is provided for channeling at least some of the light produced by the flash to a zone proximate the camera lens and extending about the direct path of light that travels from the object through the lens, to the film in the camera. That zone is generally tubular, and is indicated at 93 forward of lens 94, shutter 95, and front window 96. More specifically, the zone 93 is generally elliptical, having forwardly extending elliptical walls 98–101 formed by the block 80, those walls being roughened to diffuse light transmitted within the block and toward zone 93, impinging on such walls. Such light is transmitted from the flash bulb 91 through window 92 and into the upper extent 80a of the block 80, some of the light being reflected off the walls 81, 84, 85 and 88 toward zone 93 where it impinges on the walls 98–101. The remainder of the light from the flash passes through the block and to the object 93a, illuminating same at the time of film exposure, as by opening of shutter 95.

The direct path of light traveling from the object 93 to and through the lens (to the film 18 in the film pack) is indicated by rays 102a and 102b, 103a and 103b, and 104a and 104b, a mirror reflecting rays 102a, 103a and 104a toward the film as rays 102b, 103b and 104b. Light channeled to zone 93 via the block 80 (see rays 105, 106 and 107, for example) illuminates diffusing walls 96–101, which may be roughened for enhanced illumination. Such illumination also passes through the lens (see rays 108a and 108b, and 109a and 109b, for example) and operates to locally illuminate the film forming a light modulated background to the image of the object and to the image of reproduced graphics, as will be referred to. The graphics template overlying the film 18 in the film pack is indicated at 10.

Further, it will be observed that the elliptical or tubular bore defined by the walls of zone 93 has an axis generally coincident with an axis 111 defined by the camera lens, and extending forwardly.

Figure 13:
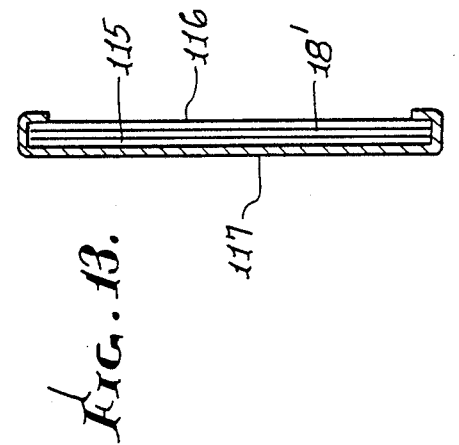
FIG. 13 shows a print in a backer.

The resultant film, when developed and displayed as a print 18' in FIG. 13, portrays a light modulated, i.e., white or near white, background on which a clear image of the object appears along with a clear image of graphics affixed to the template 10. For example, the template graphics may consist of an event representation (year, birthday, title, etc.) portrayed on the print; the portrayed object may be in the form of a portrait of a person; and these elements are on a white background obtained by the use of the channeled light from the flash. In FIG. 13, the print is mounted on a backer 115, its front is covered by a transparent sheet or disc 116, and flat receptacle 117 retains the elements in stacked relation.

Figure 14:
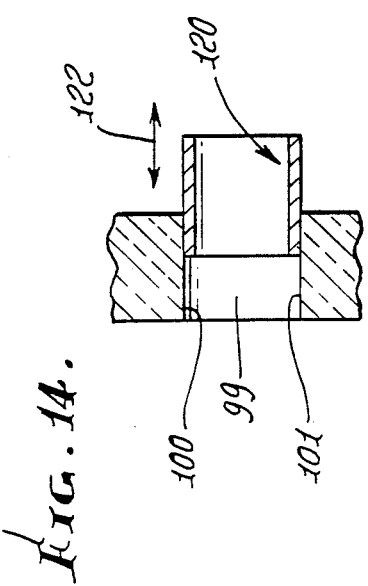
FIG. 14 shows a shiftable mask.

FIG. 14 shows a means such as a shiftable mask 120 to control the amount of light transmitted via walls 98–101 to the film. Mask 120 comprises a thin walled loop fitting the walls 98–101 and slidable forwardly and rearwardly (see arrow 122) to variably cover the walls. Mask 120 may be transparent and colored, such as blue or green, to add coloring to the background produced on the film.

The block walls may carry reflecting material to reflect the rays in the block. Block-mounting adhesive is shown at 170, for example.

Referring now to FIG. 1c, improved device 10 comprises a template 19 adapted for use in conjunction with exposure of photographic film carried by structure that includes a film pack frame. One such frame appears at 100 in FIGS. 4–8, and includes side walls 11 and 12, front and rear walls 13 and 14, a top cover having portions 15a–15d bordering an opening 16, and a bottom cover 17. That frame may consist of lightweight plastic material. The template is assembled into the frame for a film pack, as is seen at 18 in FIGS. 5–8. A portion of wall 13 is removable to allow pullout removal of individual film sheets in use, and a pull tab is seen at 85.

The template 19 is in the form of a transparent, generally planar and rectangular plastic sheet adapted to cause an image on that sheet 19 to be reproduced on successive film sheets 18. Merely as illustrative, the template is shown to carry the image "YOUR BIRTHDAY 1988", as in the form of heavy dark lines on the circular disc shaped portion 24 of the template 19, and that image is successively reproduced on each sheet of film 18 as that sheet is exposed to light passing through the template and onto the film, as the camera (into which the film pack is inserted) is operated.

The template, may be about 0.005 inches thick, for example. A sub-frame 20 is bonded to the sheet 19, and defines retainer ribs 20a–20d which are adhesively bonded to the sheet 19 and project outwardly from the top surface of sheet 19, to the same extent. Rib 20a extends parallel and close to sheet edge 19a; rib 20b extends parallel and close to sheet edge 19b; rib 20c extends parallel and close to sheet edge 19c; and rib 20d extends parallel and close to sheet edge 19d.

Sub-frame 20 is generally rectangular. See FIGS. 1b and 1c.

Figure 5:
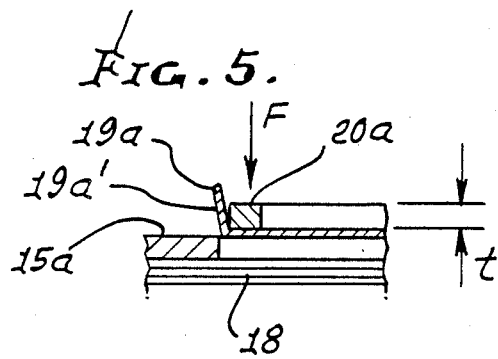
FIG. 5 is an enlarged fragmentary section showing one stage in assembly of the FIG. 1c assembly to the film pack frame.

The ribs project outwardly to an extent "t", about 1/32 inch, as seen in FIG. 5. The ribs substantially bound all of the transparent light passing zone 24 within circle 25, the template structure at 26 outwardly of circle 25 being opaque. Therefore, when the film pack is in the camera, the ribs may engage camera body structure indicated for example at 28 in FIG. 8 to block light access to zone 24 in directions parallel to the plane of sheet 19. See arrow 30 designating a ray of such light.

Figure 7:
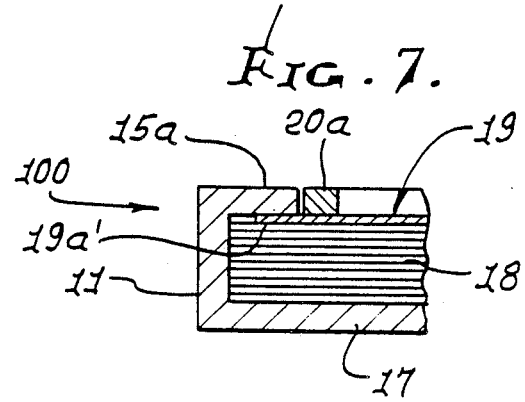
FIG. 7 is an enlarged fragmentary section taken on lines 7—7 of FIG. 4.
Figure 6:
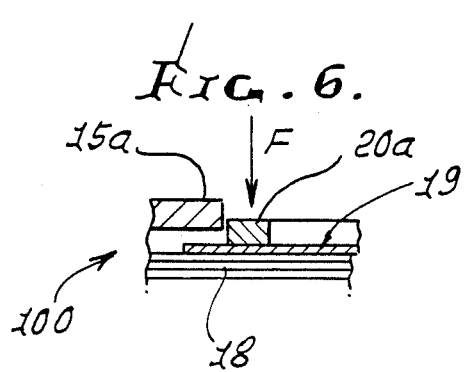
FIG. 6 is an enlarged fragmentary section showing a second stage in such assembly.
Figure 8:
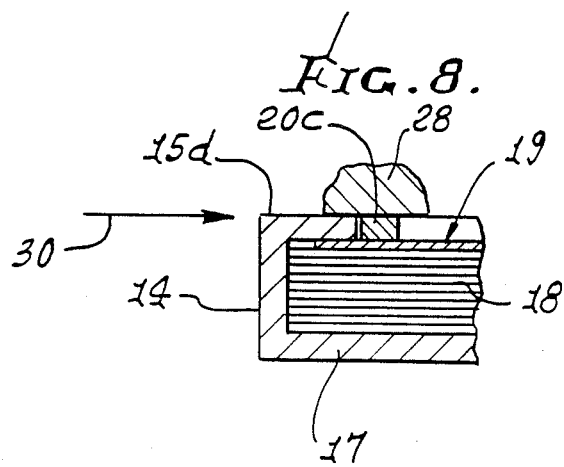
FIG. 8 is an enlarged fragmentary section like the section of FIG. 7 showing assembly into a film carrier pack, and taken on lines 8—8 of FIG. 4.

The ribs 20a–20d closely fit the inner edges 15a'–15d' of the frame top cover portions 15a–15d, when the template is assembled to the frame 100. FIGS. 5–7 show stages in such assembly, completed in FIG. 7. In FIG. 5, applied force F pushes the rib 20a downwardly, and template edge portion 19a' deflects upwardly against frame portion 15a. In FIG. 6, the rib 20a has been depressed into the film pack, below upper surface level of portion 15a. This causes the deflected portion of the template to straighten out, as shown, beneath frame portion 15a. Finally, in FIG. 7, the force F is removed, and the template portion 19a' is urged back upwardly by the film 18 (spring urged) to engage frame portion 15a. Accordingly, upon assembly of the template to the frame the template sheet window 24 remains in the path of light transmission in directions generally normal to the plane of the sheet, i.e., normal to the plane of unexposed film sheets carried by the frame or pack.

Figure 4:
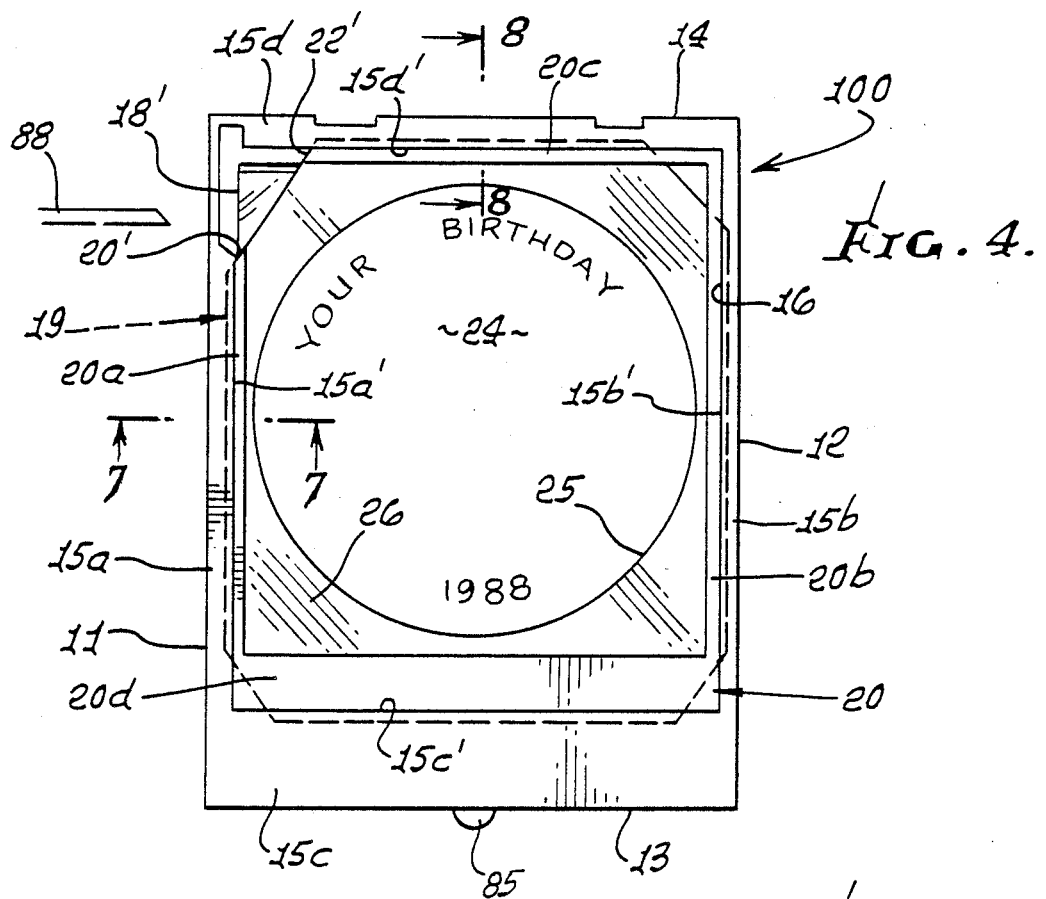
FIG. 4 is a plan view of a frame for a film pack, with the FIG. 1c template and sub-frame carried by the film pack frame.

The rib 20a terminates at 20 at a location spaced from one end 22, of the rib 20c to provide a gap therebetween for accommodating movement of a film-retracting finger carried by the camera. FIG. 4 shows an edge portion 18' of the film in that gap, and positioned to be retracted from the pack by the retracting finger after each exposure, merely as illustrated. Such a finger is schematically shown at 88.

The template, being flexible, is easily removed from its rib-determined fitted position in the frame, after frame removal from the camera, for re-use of the template upon its assembly to a fresh pack of film, since edge portions of the template are resiliently flexible.

The template most advantageously has a lateral width of about 3 5/16 inches, and a longitudinal length of about 3 11/16 inches.

The edges 19a–19d of the template may be easily fitted and adjusted under the frame top cover portions 15a–15d, upon assembly of the template to the film pack. The ribs are sufficiently thin to allow bowing or flexing of the template laterally or longitudinally upon such assembly. Rib 20b is engagable with top cover portion 15b to block rightward disassembly of the flattened (unbound) template relative to or out of the frame; and rib 20a is engagable with the top cover portion 15a to block leftward disassembly of the flattened (unbound) template relative to or out of the frame.

The assemblies as seen in FIGS. 1a–1c may be of different sizes to fit different size and configuration film packs.

I claim:

1. A device for use in a camera in conjunction with exposure of a photographic film carried by carrier structure including a frame bounding a light passing zone, and comprising
   (a) a template in the form of a locally transparent, generally planar and rectangular sheet adapted to carry an image to be reproduced on the film,
   (b) there being multiple elongated ribs integral with said sheet, and projecting outwardly from the plane of the sheet,
   (c) said multiple ribs substantially bounding all of said light passing zone to block light access to said zone in directions parallel to the plane of the sheet,
   (d) said ribs including a first laterally elongated rib at one end of the template to engage the frame adjacent said one end of the template to prevent removal of the template in response to endwise removal of exposed film from the carrier structure, whereby the template sheet remains in the path of light transmission in directions generally normal to the plane of the sheet and to unexposed film carried by the carrier structure.

2. The device of claim 1 where said ribs include a second laterally elongated rib at the opposite end of the template and extending parallel to said one rib, and third and fourth longitudinally elongated ribs respectively at opposite side edges of the sheet, all of the ribs projecting substantially equally outwardly relative to the plane of the sheet.

3. The device of claim 2 wherein the third rib terminates at a location spaced from one end of the second rib to provide a gap therebetween for accommodating movement of a film-retracting finger carried by the camera.

4. The device of claim 2 wherein the fourth rib extends between ends of the first and second ribs.

5. The device of claim 1 wherein that portion of the template between at least one rib and a locally transparent zone of the template is opaque.

6. The device of claim 1 wherein said ribs are bonded to said template sheet, and are resiliently flexible to flex with the template sheet upon its assembly to the carrier frame.

7. The device of claim 6 wherein said ribs consist of plastic material, and are sufficiently thin to allow flexing of the sheet producing bowing of the ribs.

8. The device of claim 1 and including the frame carrying stacked film directly beneath the light passing zone of the template sheet, the film adapted to be extracted parallel to the template for ejection from the camera.

9. The device of claim 1 wherein the rectangular template has the following approximate overall dimensions:
   lateral width - 3 5/16 inches
   longitudinal length - 3 11/16 inches 10. The device of claim 5 wherein the light passing zone is generally circular and transparent, the remainder of the template extending proximate all the ribs being opaque.

11. The device of claim 2 wherein each rib is spaced from, but extends parallel to the template edge closest to that rib.

12. The device of claim 11 wherein the template has edge portions between said ribs and the template edges, said edge portions being resiliently flexible to be deflected upon engagement with the carrier frame when the template and ribs are fitted to the carrier frame.

* * * * *